United States Patent
Lee et al.

(10) Patent No.: US 12,412,885 B2
(45) Date of Patent: Sep. 9, 2025

(54) ELECTRODE STRUCTURE, BIPOLAR ALL-SOLID SECONDARY BATTERY INCLUDING THE SAME, AND METHOD OF MANUFACTURING ELECTRODE STRUCTURE

(71) Applicant: Samsung SDI Co., Ltd., Yongin-si (KR)

(72) Inventors: Eungyeong Lee, Yongin-si (KR); Bokkyu Choi, Yongin-si (KR); Younggyoon Ryu, Yongin-si (KR); Jaegu Yoon, Yongin-si (KR); Joowook Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 49 days.

(21) Appl. No.: 17/450,011

(22) Filed: Oct. 5, 2021

(65) Prior Publication Data

US 2022/0140312 A1    May 5, 2022

(30) Foreign Application Priority Data

Oct. 30, 2020   (KR) ........................ 10-2020-0143878

(51) Int. Cl.
*H01M 4/13* (2010.01)
*H01M 4/66* (2006.01)
(Continued)

(52) U.S. Cl.
CPC ............. *H01M 4/13* (2013.01); *H01M 4/661* (2013.01); *H01M 4/70* (2013.01);
(Continued)

(58) Field of Classification Search
CPC ....... H01M 50/233–238; H01M 50/24; H01M 4/13; H01M 4/661; H01M 4/70; H01M 10/0525; H01M 2004/029
See application file for complete search history.

(56) References Cited

U.S. PATENT DOCUMENTS 3,775,190 A * 11/1973 Oakley ............... H01M 4/0419
29/623.3
9,299,973 B2    3/2016 Kinoshita et al.
(Continued)

FOREIGN PATENT DOCUMENTS

| CN | 101385161 A | 3/2009 |
|----|----|----|
| CN | 108511763 A | 9/2018 |

(Continued)

OTHER PUBLICATIONS

Arie, A. A., & Lee, J. K. (2011). Electrochemical characteristics of lithium metal anodes with diamond like carbon film coating layer. Diamond and related materials, 20(3), 403-408. (Year: 2011).*

(Continued)

*Primary Examiner* — Milton I Cano
*Assistant Examiner* — Albert Michael Hilton
(74) *Attorney, Agent, or Firm* — Womble Bond Dickinson (US) LLP

(57) ABSTRACT

An electrode structure, a bipolar all-solid secondary battery including the same, and a method of manufacturing the electrode structure are provided. The electrode structure includes: a current collector having a first surface and a second surface, wherein the first surface includes a first portion, a second portion, and an intermediate portion between the first portion and the second portion, the first portion and the second portion are arranged toward the outside in opposite directions to each other around the intermediate portion, and the second surface has an inward-folded structure; a cathode active material layer formed on (Continued)

the first portion of the first surface; an anode active material layer formed on the second portion of the first surface; and a compression pad arranged inside the inward-folded structure of the current collector.

10 Claims, 3 Drawing Sheets

(51) Int. Cl.
    *H01M 4/70*     (2006.01)
    *H01M 10/0525*     (2010.01)
    *H01M 4/02*     (2006.01)

(52) U.S. Cl.
    CPC .. *H01M 10/0525* (2013.01); *H01M 2004/029* (2013.01); *H01M 2300/0068* (2013.01)

(56) References Cited

U.S. PATENT DOCUMENTS

| | | | |
|---|---|---|---|
| 10,665,901 B2 | 5/2020 | Honda | |
| 10,833,370 B2 | 11/2020 | Honda | |
| 2004/0180259 A1 | 9/2004 | Kim et al. | |
| 2009/0023059 A1 | 1/2009 | Kinoshita et al. | |
| 2015/0004498 A1* | 1/2015 | Cheng | H01G 11/52 429/247 |
| 2018/0248228 A1* | 8/2018 | Honda | H01M 10/0583 |
| 2018/0309134 A1* | 10/2018 | Honda | H01M 10/0431 |
| 2018/0366785 A1* | 12/2018 | Honda | H01M 4/665 |
| 2019/0136099 A1* | 5/2019 | Kobori | C09J 167/00 |
| 2019/0214677 A1 | 7/2019 | Yamada et al. | |
| 2020/0243838 A1* | 7/2020 | Jang | H01M 4/0438 |
| 2020/0251785 A1 | 8/2020 | Honda | |
| 2020/0343591 A1* | 10/2020 | Ohta | H01M 10/0585 |
| 2021/0296736 A1 | 9/2021 | Chikagawa | |
| 2022/0123369 A1 | 4/2022 | Choi et al. | |
| 2022/0173463 A1* | 6/2022 | Yamamoto | H01M 50/249 |

FOREIGN PATENT DOCUMENTS

| | | | |
|---|---|---|---|
| CN | 109072041 A | 12/2018 | |
| JP | 4425613 B2 | 11/2004 | |
| JP | 2018-142534 A | 9/2018 | |
| JP | 2019-3934 A | 1/2019 | |
| JP | 2019-212554 A | 12/2019 | |
| KR | 10-0868256 B1 | 6/2006 | |
| KR | 10-2048822 B1 | 3/2017 | |
| WO | WO 2013/005358 A1 | 1/2013 | |
| WO | 2020/116090 A1 | 6/2020 | |
| WO | WO-2020203684 A1 * | 10/2020 | H01M 10/0525 |

OTHER PUBLICATIONS

Kyu-Nam Jung et al., Solid-State Lithium Batteries: Bipolar Design, Fabrication, and Electrochemistry, ChemElectroChem Reviews, 2019, pp. 3842-3859, vol. 6, Wiley-VCH Verlag GmbH & Co. KGaA, Weinheim.
Extended European Search Report dated Mar. 18, 2022 of the corresponding European Patent Application No. 21203842.6, 8 pages.
Chinese Office Action dated Dec. 26, 2023, for corresponding Application No. 202111197977.3, and English translation, 18 pages.

* cited by examiner

ELECTRODE STRUCTURE, BIPOLAR ALL-SOLID SECONDARY BATTERY INCLUDING THE SAME, AND METHOD OF MANUFACTURING ELECTRODE STRUCTURE

CROSS-REFERENCE TO RELATED APPLICATION

This application claims priority to and the benefit of Korean Patent Application No. 10-2020-0143878, filed on Oct. 30, 2020, in the Korean Intellectual Property Office, the disclosure of which is incorporated by reference herein in its entirety.

BACKGROUND

1. Field

One or more embodiments relate to an electrode structure, a bipolar all-solid secondary battery including the same, and a method of manufacturing the electrode structure.

2. Description of the Related Art

Recently, in response to industrial demands, batteries having high energy density and safety have been actively developed. For example, lithium-ion batteries are being utilized not only in the fields of information-related apparatuses (e.g., appliances) and communication apparatuses (e.g., appliances), but also in the fields of automobiles. In the fields of automobiles, safety is especially important because it has an influence to driver and traffic safety.

Because commercially available lithium-ion batteries utilize an electrolyte solution including a flammable organic solvent, there is a possibility of overheating and catching fire when a short circuit occurs. In this regard, all-solid batteries utilizing a solid electrolyte instead of an electrolyte solution have been proposed.

Because all-solid batteries do not utilize flammable organic solvents, even when a short circuit occurs, the possibility of catching fire or explosion may be greatly reduced. Accordingly, safety of such all-solid secondary batteries may be greatly increased (e.g., improved) as compared with that of lithium-ion batteries utilizing an electrolyte solution.

Further, one of the characteristics of all-solid secondary batteries is that they can be easily built with a bipolar structure unlike related art lithium-ion batteries, and thus the number of parts may be reduced, and it is easier for large currents to flow, thus allowing the development of high-power, and high-energy-density cells having high voltages. However, with a bipolar structure in which electrodes are arranged in series, it is difficult to design a structure capable of absorbing a volume change due to a lithium deposition reaction utilized in the anode of an all-solid secondary battery.

SUMMARY

Aspects according to one or more embodiments are directed toward an electrode structure capable of absorbing a volume change of an anode in an all-solid-state secondary battery.

Aspects according to one or more embodiments are directed toward a bipolar all-solid secondary battery including the electrode structure.

Aspects according to one or more embodiments are directed toward a method of manufacturing the electrode structure.

Additional aspects will be set forth in part in the description which follows and, in part, will be apparent from the description, or may be learned by practice of the presented embodiments of the disclosure.

According to one or more embodiments, an electrode structure includes:
a current collector having a folded structure including an outer surface and an inner surface, the inner surface defining an inner space, wherein the outer surface includes a first portion, a second portion facing oppositely away from the first portion, and an intermediate portion between the first portion and the second portion;
a cathode active material layer on the first portion of the outer surface;
an anode active material layer on the second portion of the outer surface; and
a compression pad disposed inside the inner space of the folded structure of the current collector.

According to one or more embodiments, a bipolar all-solid secondary battery includes a stacked structure including a plurality of unit cells, wherein each unit cell of the plurality of unit cells includes the electrode structure; and a solid electrolyte layer on the cathode active material layer.

According to one or more embodiments, a method of manufacturing an electrode structure includes:
preparing a current collector having a first surface and a second surface opposite to the first surface, the first surface including a first portion, a second portion, and an intermediate portion between the first portion and the second portion;
coating the first portion with a cathode active material layer;
coating the second portion with an anode active material layer;
folding the intermediate portion to create an inner space of the current collector with the second surface being an inner surface of the current collector, and the first portion and the second portion being oppositely facing outer surfaces; and
providing a compression pad in the inner space of the current collector.

BRIEF DESCRIPTION OF THE DRAWINGS

The above and other aspects, features, and enhancements of certain embodiments of the disclosure will be more apparent from the following description taken in conjunction with the accompanying drawings, in which.

DETAILED DESCRIPTION

Figure 1:
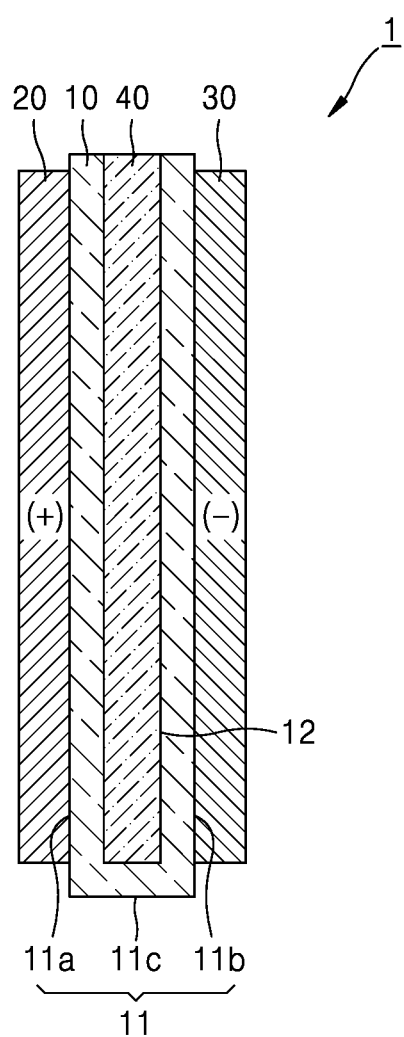
FIG. 1 is a schematic cross-sectional view of an electrode structure according to an embodiment.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The subject matter of the present disclosure will now be described more fully with reference to the accompanying drawings, in which example embodiments are illustrated. However, the subject matter of the present disclosure may be embodied in many different forms, should not be construed as being limited to the embodiments set forth herein, and should be construed as including all modifications, equivalents, and alternatives within the scope of the present disclosure.

The terms used herein is for the purpose of describing particular embodiments only and is not intended to be limiting of the present disclosure. Singular expressions include plural expressions unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the thickness may be enlarged or reduced in order to clearly illustrate various layers and regions. Throughout the specification, the same reference numerals are used to refer to similar parts. Throughout the specification, when an element such as a layer, a film, a region or a component is referred to as being "on" another layer or element, it can be "directly on" the other layer or element, or intervening layers, regions, or components may also be present. Although the terms "first", "second", "third", etc., may be used herein to describe various elements, components, regions, and/or layers, these elements, components, regions, and/or layers should not be limited by these terms. These terms are used only to distinguish one component from another, and not for purposes of limitation.

Hereinafter, a bipolar stack unit cell structure according to embodiments and an all-solid secondary battery including the same will be described in more detail.

In related art, it is difficult to design a structure capable of absorbing a volume change due to a lithium deposition reaction utilized (e.g., happening) in an anode of an all-solid secondary battery with a bipolar structure, and without a buffer structure of an anode layer, a thickness variation inside a cell may become severe due to non-uniform lithium electrodeposition, and partial charge-discharge may occur, which may deteriorate battery performance and cause (e.g., increase) the risk of a short circuit.

In related art all-solid secondary batteries, a structure in which stacked cells are placed in a bipolar structure to increase the capacity of a cell has been proposed, but a structure for absorbing a volume change may be desired (e.g., may not have been proposed).

Accordingly, in order to solve the above problems in a bipolar cell utilizing the same current collector, the present discloser of the present inventive entity is intended to provide an electrode structure capable of having a buffer structure inside (e.g., a space formed by) the same current collector, a bipolar all-solid secondary battery including the same, and a method of manufacturing the electrode structure.

Electrode Structure

An electrode structure according to an embodiment includes:
  a current collector having a first surface and a second surface opposite to (e.g., facing away from) the first surface, wherein the first surface includes a first portion, a second portion, and an intermediate portion between the first portion and the second portion, the first portion and the second portion are arranged toward the outside in opposite directions to each other around the intermediate portion, and the second surface has an inward-folded structure. That is, the current collector forms a folded structure with the second surface forms an inner surface of the folded structure, and the first portion and the second portion form oppositely facing outer surfaces of the folded structure;
  a cathode active material layer on the first portion of the first surface;
  an anode active material layer on the second portion of the first surface; and
  a compression pad disposed inside the inward-folded structure (e.g., inside an inner space of the folded structure defined (e.g., surrounded) by the second surface) of the current collector.

In the electrode structure according to an embodiment, the compression pad is provided inside the folded current collector to absorb a volume change of an anode layer during charging and discharging. Through this buffer structure of the current collector, the anode layer may be protected against a volume change during charging and discharging, thereby improving the durability of a bipolar all-solid secondary battery.

The electrode structure may be manufactured, for example, by the following method.

A method of manufacturing an electrode structure according to an embodiment includes:
  preparing a current collector having a first surface and a second surface opposite to the first surface, the first surface including a first portion, a second portion, and an intermediate portion between the first portion and the second portion;
  coating the first portion with a cathode active material layer;
  coating the second portion with an anode active material layer;
  folding the intermediate portion to create an inner space with the second surface being an inner surface, and the first portion and the second portion being oppositely facing outer surfaces; and
  providing a compression pad to the inward-folded inside of the current collector.

FIG. 1 is a schematic cross-sectional view of an electrode structure according to an embodiment. As shown in FIG. 1, an electrode structure 1 has a current collector 10 having a folded structure, a cathode active material layer 20, an anode active material layer 30, and a compression pad 40 disposed inside the (e.g., inner space of) folded structure of the current collector 10.

Figure 2:
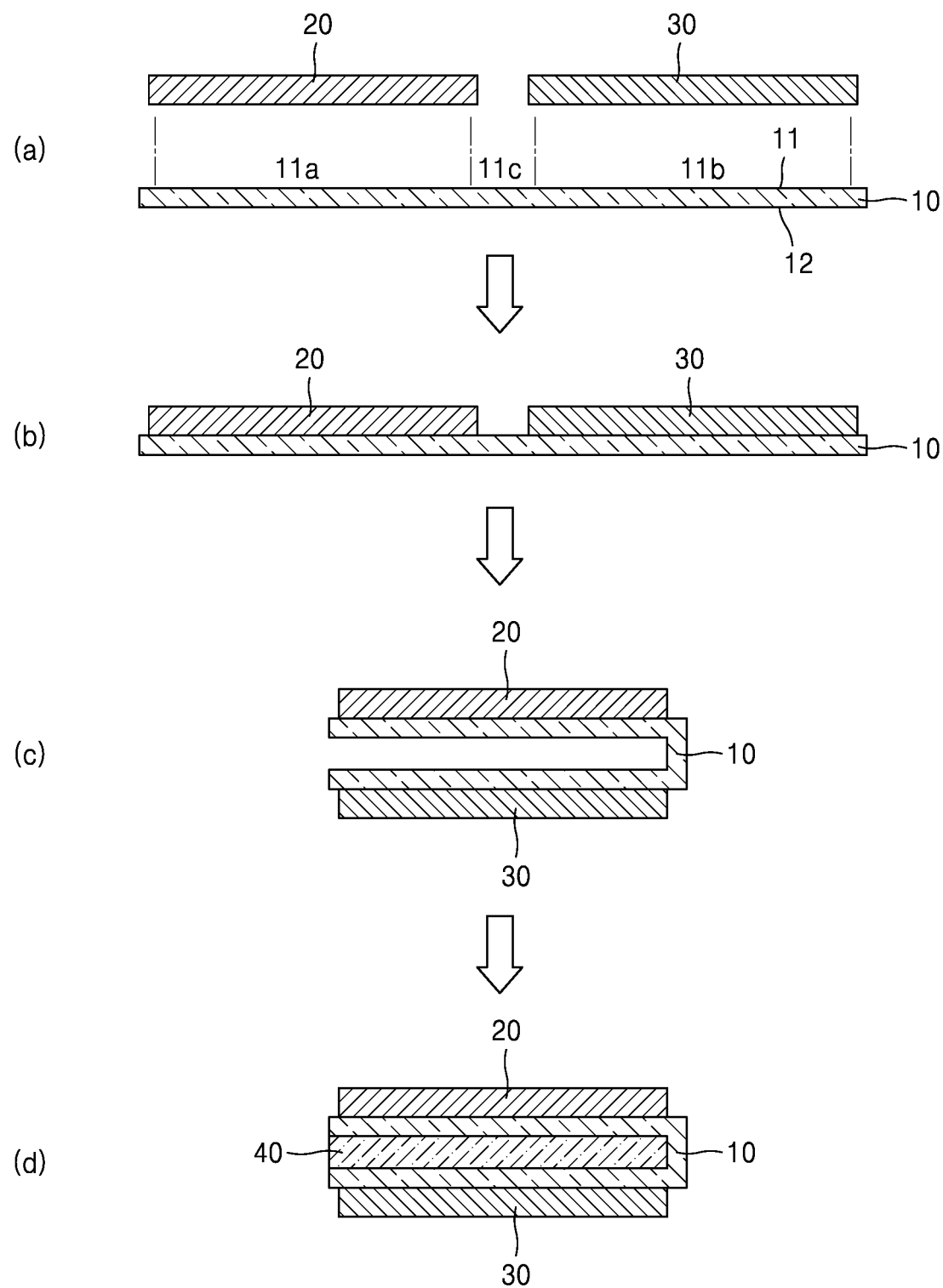
FIG. 2 is a schematic view illustrating a process of manufacturing an electrode structure according to an embodiment.

FIG. 2 is a schematic view illustrating a process of manufacturing an electrode structure according to an embodiment. As shown in FIG. 2, the current collector 10 has both of a first surface 11 and a second surface 12, and the first surface 11 includes a first portion 11a, a second portion 11b, and an intermediate portion 11c dividing (e.g., separating/connecting) the first portion 11a from the second portion 11b.

A cathode active material layer 20 is applied onto the first portion 11a of the first surface 11, and an anode active material layer 30 is applied onto the second portion 11b. The intermediate portion 11c is an uncoated portion on which an active material layer is not applied. Meanwhile, the entire second surface 12 may be an uncoated portion.

When the current collector 10 is folded and bent around the intermediate portion 11c, the first portion 11a coated with the cathode active material layer 20 and the second portion 11b coated with the anode active material layer 30 are arranged toward the outside (e.g., form the outer surface of the collector 10) in opposite directions to each other, and the second surface 12 is folded inward (e.g., forms the inner surface of the collector 10).

As such, the compression pad 40 is disposed inside the folded structure of the current collector 10, thereby forming the electrode structure 1 having a buffer structure. The compression pad 40 is provided inside the folded current collector 10, thereby capable of absorbing a volume change of the anode active material layer 30 during charging and discharging.

A solid electrolyte layer 50 (FIG. 3) is disposed on the cathode active material layer 20 of the electrode structure 1, thereby forming a unit cell 2 constituting the all-solid secondary battery according to an embodiment.

Hereinafter, each component will be described in more detail.

Current Collector

As the current collector 10 of a bipolar battery, which may act as both a cathode and an anode, a current collector having a wide withstand voltage range (e.g., can withstand a wide voltage range) may be utilized. The voltage range (e.g., the withstand voltage range) of the current collector 10 may be, for example, about −1 V to about 5.5 V, or about −0.5 V to about 5.5 V. Within the above ranges, it may be suitably utilized as the current collector 10 of a bipolar battery.

The current collector 10 may be made of, for example, a material that does not react with lithium, that is, does not form an alloy and/or a compound with lithium. Examples of the material suitable for constituting the current collector 10 may include, but are not limited to, stainless steel, aluminum (Al), copper (Cu), titanium (Ti), iron (Fe), cobalt (Co), nickel (Ni), alloys thereof, and clads thereof. Any suitable material utilized to constitute a current collector of a bipolar battery in the related art may be utilized. The current collector 10 may be made of one of the above-described metals or an alloy of two or more metals, and/or may be made of a coating material.

According to an embodiment, the current collector 10 may be made of stainless steel. Because stainless steel has a wide withstand voltage range of about −0.5 V to about 5.5 V, it may be suitably utilized as the current collector 10 of a bipolar battery. According to an embodiment, an alloy such as Al—Cu clad, which can withstand dislocations in a wide range, may also be suitably utilized for the current collector 10.

The current collector 10 may be made in the form of a plate or foil.

The electrode structure 1 may further include, for example, a thin film containing an element capable of forming an alloy with lithium on the second portion 11b of the first surface 11 of the current collector 10. The thin film may be disposed between the current collector 10 and the anode active material layer 30. The thin film contains, for example, an element capable of forming an alloy with lithium. Examples of the element capable of forming an alloy with lithium may include, but are not limited to, gold, silver, zinc, tin, indium, silicon, aluminum, and bismuth. Any element in the related art that forms an alloy with lithium may be utilized. The thin film may be formed of one of these metals or may be formed of an alloy of several kinds (e.g., types) of metals. As the thin film is disposed between the current collector 10 and the anode active material layer 30, for example, the deposition form of the second anode active material layer deposited between the thin film 24 and the anode active material layer 30 may be further flattened, and the cycle characteristics of the all-solid secondary battery 3 may be further improved.

The thickness of the thin film may be, for example, about 1 nm to about 800 nm, about 10 nm to about 700 nm, about 50 nm to about 600 nm, or about 100 nm to about 500 nm. When the thickness of the thin film is less than about 1 nm, it may be difficult to exert a function as the thin film. When the thickness of the thin film is too thick, the thin film itself absorbs lithium such that the amount of lithium deposited in an anode decreases, so that the energy density of the all-solid secondary battery 3 decreases, and the cycle characteristics of the all-solid secondary battery 3 may be deteriorated. The thin film may be disposed on first and second anode current collectors 10 and 10' by, for example, a vacuum deposition method, a sputtering method, a plating method, and/or the like, but the present disclosure is not necessarily limited to these methods. Any suitable method capable of forming the thin film in the related art may be utilized.

Compression Pad

The compression pad 40 inside the folded structure of the current collector 10 may be made in the form of a sheet including an elastic material.

The elastic material may include at least one selected from polyurethane, natural rubber, spandex, butyl rubber (isobutylene isoprene rubber, IIR), fluoroelastomer, elastomer, ethylene-propylene rubber (EPR), styrene-butadiene rubber (SBR), chloroprene, elastin, epichlorohydrin rubber, nylon, terpene, isoprene rubber, polybutadiene, nitrile rubber, thermoplastic elastomer, silicone rubber, ethylene-propylene-diene rubber (EPDM), ethylene vinyl acetate (EVA), halogenated butyl rubber, neoprene, and copolymers thereof. However, the present disclosure is not limited thereto, and any elastic material may be utilized without limitation as long as it has elasticity. According to an embodiment, the compression pad 40 may be made of a urethane-based material, for example, polyurethane.

According to an embodiment, the compression pad 40 may be formed of a urethane-based polymer sheet having a deformation rate of about 30% to about 60%.

The compression pad 40 may be pressed (e.g., may be capable of being pressed) to have a thickness of about 40% to about 90% of an initial thickness thereof before being pressed. For example, the compression pad 40 may be pressed to have a thickness of about 50% to about 85%, about 60% to about 80%, or about 65% to about 75% of the initial thickness thereof before being pressed. Because the volume change of the anode is effectively absorbed within the above ranges, it is possible to smoothly charge and discharge an all-solid secondary battery.

The thickness of the compression pad 40 may be in a range of about 200% to about 500% of a thickness of a lithium deposition layer of an anode formed when charging an all-solid secondary battery. In an all-solid secondary battery, the thickness of the lithium deposition layer of the anode is determined in proportion to the current density of the cathode. That is, the thickness of the lithium deposition layer of the anode is determined according to the amount of lithium moving from the cathode to the anode, and thereby the volume change of the anode occurs (e.g., the volume of the anode thereby increases). Accordingly, the thickness of the compression pad 40 may be determined to absorb the volume change of the anode. Therefore, the thickness of the compression pad 40 may be set to be in a range of about 200% to about 500% of a thickness of a lithium deposition layer of the anode formed when charging an all-solid secondary battery, thereby effectively absorbing the voltage change of the anode. For example, the thickness of the compression pad may be in a range of about 250% to about 450%, or, about 300% to about 400% of a thickness of a lithium deposition layer of the anode formed when charging an all-solid secondary battery.

The thickness of the compression pad 40 may be set in the range of about 50 μm to about 300 μm, and in some case, may be selectively set in the range of about 100 μm to about 150 μm, about 200 μm to about 300 μm, or about 50 μm to about 100 μm.

As such, because the compression pad 40 is provided in the folded structure of the current collector, the volume change caused by a lithium (Li) deposition reaction used in the anode may be absorbed, and thus the anode layer may be protected, thereby improving the durability of a bipolar all-solid secondary battery.

Cathode Layer

As shown in FIG. 1, in the electrode structure 1, the cathode active material layer 20 is disposed on the first portion 11a of the first surface 11 of the current collector 10.

Cathode Active Material Layer: Cathode Active Material

The cathode active material layer 20 includes, for example, a cathode active material and a solid electrolyte. The solid electrolyte included in the cathode active material layer 20 may be similar to or different from the solid electrolyte included in the electrolyte layer 50. For further details of the solid electrolyte, refer to those of the electrolyte layer 50.

The cathode active material is a cathode active material capable of reversibly absorbing and desorbing lithium ions. The cathode active material may be, for example, a lithium transition metal oxide (such as a lithium cobalt oxide (LCO), a lithium nickel oxide, a lithium nickel cobalt oxide, a lithium nickel cobalt aluminum oxide (NCA), a lithium nickel cobalt manganese oxide (NCM), and/or lithium manganate), lithium and iron phosphate, a nickel sulfide, a copper sulfide, a lithium sulfide, an iron oxide, a vanadium oxide, and/or the like, but is not limited thereto, and any one available as a cathode active material in the related art may be utilized. The cathode active materials may each be utilized alone or as a mixture of two or more thereof.

The lithium transition metal oxide may be a compound represented by one of, for example, $Li_aA_{1-b}B_bD_2$ (where $0.90 \le a \le 1$, and $0 \le b \le 0.5$); $Li_aE_{1-b}B_bO_{2-c}D_c$ (where $0.90 \le a \le 1$, $0 \le b \le 0.5$, and $0 \le c \le 0.05$); $LiE_{2-b}B_bO_{4-c}D_c$ (where $0 \le b \le 0.5$, and $0 \le c \le 0.05$); $Li_aNi_{1-b-c}Co_bB_cD_\alpha$ (where $0.90 \le a \le 1$, $0 \le b \le 0.5$, $0 \le c \le 0.05$, and $0 < \alpha \le 2$); $Li_aNi_{1-b-c}Co_bB_cO_{2-\alpha}H_\alpha$ (where $0.90 \le a \le 1$, $0 \le b \le 0.5$, $0 \le c \le 0.05$, and $0 < \alpha < 2$); $Li_aNi_{1-b-c}Co_bB_cO_{2-\alpha}H_2$ (where $0.90 \le a \le 1$, $0 \le b \le 0.5$, $0 \le c \le 0.05$, and $0 < \alpha < 2$); $Li_aNi_{1-b-c}Mn_bB_cD_\alpha$ (where $0.90 \le a \le 1$, $0 \le b \le 0.5$, $0 \le c \le 0.05$, and $0 < \alpha \le 2$); $Li_aNi_{1-b-c}Mn_bB_cO_{2-\alpha}H_\alpha$ (where $0.90 \le a \le 1$, $0 \le b \le 0.5$, $0 \le c \le 0.05$, and $0 < \alpha < 2$); $Li_aNi_{1-b-c}Mn_bB_cO_{2-\alpha}H_2$ (where $0.90 \le a \le 1$, $0 \le b \le 0.05$, $0 \le c \le 0.05$, and $0 < \alpha < 2$); $Li_aNi_bE_cG_dO_2$ (where $0.90 \le a \le 1$, $0 \le b \le 0.9$, $0 \le c \le 0.5$, and $0.001 \le d \le 0$); $Li_aNi_bCo_cMn_dGeO_2$ (where $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1$, and $0.001 \le b \le 0.1$); $Li_aCoG_bO_2$ (where $0.90 \le a \le 1$ and $0.001 \le b \le 0.1$); $Li_aMnG_bO_2$ (where $0.90 \le a \le 1$ and $0.001 \le b \le 0.1$); $Li_aMn_2G_bO_4$ (where, $0.90 \le a \le 1$ and $0.001 \le b \le 0.1$); $Li_aNi_bCo_cMn_dGeO_2$ (where, $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where, $0.90 \le a \le 1$ and $0.001 \le b \le 0.1$); $Li_aCoG_bO_2$ (where, $0.90 \le a \le 1$ and $0.001 \le b \le 0.1$); $Li_aMnG_bO_2$ (where, $0.90 \le a \le 1$ and $0.001 \le b \le 0.1$); $Li_aMn_2G_bO_4$ (where, $0.90 \le a \le 1$ and $0.001 \le b \le 0.1$); $QO_2$; $QS_2$; $LiQS_2$; $V_2O_5$; $LiV_2O_5$; $LiLO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$. In these compounds, A is Ni, Co, Mn, or a combination thereof; B is Al, Ni, Co, Mn, Cr, Fe, Mg, Sr, V, a rare earth element, or a combinations thereof; D is O, F, S, P, or a combination thereof; E is Co, Mn, or a combination thereof; H is F, S, P, or a combination thereof; G is Al, Cr, Mn, Fe, Mg, La, Ce, Sr, V, or a combination thereof; Q is Ti, Mo, Mn, or a combination thereof; L is Cr, V, Fe, Sc, Y, or a combination thereof; and J is V, Cr, Mn, Co, Ni, Cu, or a combination thereof. A compound having a coating layer added on a surface thereof may be also utilized, and a mixture having the compound described above and a coating layer which are added thereto may be also utilized. The coating layer added to the surface of the compound includes, for example, a coating element compound of an oxide, a hydroxide, an oxyhydroxide, an oxycarbonate, and/or a hydroxycarbonate of the coating element. The compound forming the coating layer is amorphous or crystalline. The coating elements included in the coating layer may be Mg, Al, Co, K, Na, Ca, Si, Ti, V, Sn, Ge, Ga, B, As, Zr, or a mixture thereof. A method of forming the coating layer may be any suitable one that does not adversely affect properties of the cathode active material. The coating method may be, for example, spraying, coating, and/or dipping. Because a specific coating method can be well understood by people in the art, detailed descriptions thereof will be omitted.

The cathode active material may include, for example, a lithium salt of a transition metal oxide having a layered rock salt kind (e.g., type) structure among the above-described lithium transition metal oxides. The "layered rock salt kind (e.g., type) structure", for example, is a structure wherein an oxygen atom layer and a metal atom layer are alternately and regularly arranged in the direction of <111> of a cubic rock salt kind (e.g., type) structure, whereby each atom layer forms a two-dimensional plane. "Cubic rock salt kind (e.g., type) structure" refers to a sodium chloride kind (e.g., type) (NaCl kind (e.g., type)) structure, which is a kind (e.g., type) of crystal structure, and, specifically, has a structure in which each of cations and anions are arranged in a face-centered cubic lattices (FCCs) and to be displaced from each other by ½ of a ridge of a unit lattice. A lithium transition metal oxide having the layered rock salt kind (e.g., type) structure may be a ternary lithium transition metal oxide, for example, $LiNi_xCo_yAl_zO_2$ (NCA) and/or $LiNi_xCo_yMn_zO_2$ (NCM) ($0<x<1$, $0<y<1$, $0<z<1$, $x+y+z=1$). When the cathode active material includes a ternary lithium transition metal oxide having a layered rock salt kind (e.g., type) structure, the energy density and thermal stability of the all-solid secondary battery 3 are further improved.

The cathode active material may be covered by the coating layer as described above. The coating layer may be any one suitable as a coating layer of the cathode active material of the all-solid secondary battery. The coating layer may be, for example, $Li_2O$—$ZrO_2$ and/or the like.

When the cathode active material includes nickel (Ni) as a ternary lithium transition metal oxide (such as NCA and/or NCM), the capacity density of the all-solid secondary battery 1 may be increased, whereby metal elution of the cathode active material in a charged state may be reduced. As a result, cycle characteristics in the charge state of the all-solid secondary battery 3 are improved.

The shape of the cathode active material may be, for example, a sphere or an elliptical sphere. The particle diameter of the cathode active material is not particularly limited and may be within a range applicable to a related art all-solid secondary battery. The content of the cathode active material in the cathode layer 10 is also not particularly limited and may be within a range applicable to a related art all-solid secondary battery.

Cathode Active Material Layer: Solid Electrolyte

The cathode active material layer 20 may include, for example, a solid electrolyte. The solid electrolyte included in the cathode active material layer 20 may be the same as or different from the solid electrolyte included in the electrolyte layer 50. For details of the solid electrolyte, refer to those of the electrolyte layer 50.

The solid electrolyte included in the cathode active material layer 20 may have a smaller average particle diameter D50 of particles of the solid electrolyte than that of the particles of the solid electrolyte included in the electrolyte layer 50. For example, the average particle diameter D50 of the particles of the solid electrolyte included in the cathode active material layer 20 may be about 90% or less, about 80% or less, about 70% or less, about 60% or less, about 50% or less, about 40% or less, about 30% or less, or about 20% or less of the average particle diameter D50 of the particles of the solid electrolyte included in the electrolyte layer 50.

The average particle diameter D50 is, for example, a median particle diameter D50. The median particle diameter D50 is, for example, a particle size corresponding to a 50% cumulative volume calculated from a particle having a small particle size in a particle size distribution measured by a laser diffraction method.

Cathode Active Material Layer: Binder

The cathode active material layer 20 may include a binder. Examples of the binder may include, but are not limited to, styrene butadiene rubber (SBR), polytetrafluoroethylene, polyvinylidene fluoride, and polyethylene. Any suitable binder utilized in the related art may be utilized.

Cathode Active Material Layer: Conductive Material

The cathode active material layer 20 may include a conductive material. Examples of the conductive material may include, but are not limited to, graphite, carbon black, acetylene black, Ketjen black, carbon fiber, and metal powder. Any suitable conductive material utilized in the related art may be utilized.

Cathode Active Material Layer: Other Additives

The cathode active material layer 20 may further include additives such as a filler, a coating agent, a dispersing agent, and/or an ion-conductive auxiliary agent in addition to the above-described cathode active material, solid electrolyte, binder, and conductive material.

Any suitable materials generally utilized in the related art for electrodes of all-solid secondary batteries may be utilized, as the filler, the coating agent, the dispersing agent and/or the ion-conductive auxiliary agent, included in the cathode active material layer 20.

Electrolyte Layer

Figure 3:
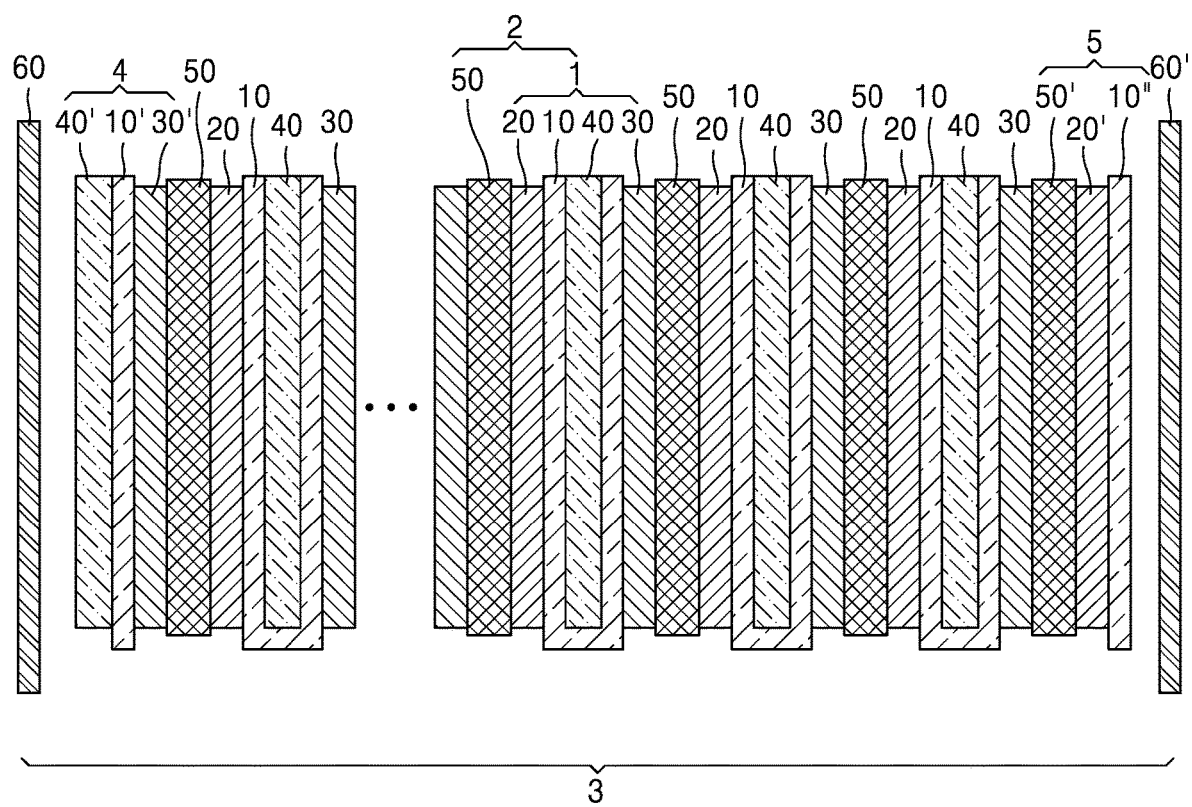
FIG. 3 is a schematic cross-sectional view of a bipolar all-solid secondary battery according to an embodiment.

As shown in FIG. 3, the electrolyte layer 50 is disposed on the cathode active material layer 20, thereby forming the unit cell 2 including the electrode structure 1 and the electrolyte layer 50. The electrolyte layer 50 may be a solid electrolyte layer.

Solid Electrolyte Layer]: Solid Electrolyte

The solid electrolyte may be, for example, a sulfide-based solid electrolyte. The sulfide-based solid electrolyte may be, for example, at least one selected from $P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each a positive number, and Z is one selected from Ge, Zn and Ga), $Li_2S$—$GeS_2$, $Li_2S$—$SiS_2$—$Li_3PO_4$, $Li_2S$—$SiS_2$—$Li_pMO_q$ (where p and q are each a positive number, and M is one selected from P, Si, Ge, B, Al, Ga, and In), $Li_{7-x}PS_{6-x}Cl_x$ (0≤x≤2), $Li_{7-x}PS_{6-x}Br_x$ (0≤x≤2), and $Li_{7-x}PS_{6-x}I_x$ (0≤x≤2). In some embodiments, the sulfide-based solid electrolyte may be prepared by treating a starting material such as $Li_2S$ and/or $P_2S_5$ by a melt quenching method or a mechanical milling method. After this treatment, heat treatment may be performed. The solid electrolyte may be amorphous, crystalline, or a mixed state thereof. The solid electrolyte may include sulfur (S), phosphorus (P), and/or lithium (Li) as constituent elements among the above-described sulfide-based solid electrolyte materials. For example, the solid electrolyte may be a material including $Li_2S$—$P_2S_5$. When a solid electrolyte including $Li_2S$—$P_2S_5$ as a material of the sulfide-based solid electrolyte forming the solid electrolyte, the mixing molar ratio of $Li_2S$ and $P_2S_5$ may be, for example, in the range of $Li_2S$:$P_2S_5$=about 50:50 to about 90:10.

The sulfide-based solid electrolyte may include, for example, an argyrodite kind (e.g., type) solid electrolyte represented by the following Formula 1:

$$Li^+{}_{12-n-x}A^{n+}X^{2-}{}_{6-x}Y^-{}_x, \qquad \text{Formula 1}$$

in Formula 1, A is P, As, Ge, Ga, Sb, Si, Sn, Al, In, Ti, V, Nb or Ta; X is S, Se or Te; Y is Cl, Br, I, F, CN, OCN, SCN, or $N_3$; and 1≤n≤5, and 0≤x≤2 are satisfied. The sulfide-based solid electrolyte may be an argyrodite-kind (e.g., type) compound including at least one selected from $Li_{7-x}PS_{6-x}Cl_x$ (0≤x≤2), $Li_{7-x}PS_{6-x}Br_x$ (0≤x≤2), and $Li_{7-x}PS_{6-x}I_x$ (0≤x≤2). The sulfide-based solid electrolyte may be, for example, an argyrodite-kind (e.g., type) compound including at least one selected from $Li_6PS_5Cl$, $Li_6PS_5Br$, and $Li_6PS_5I$.

The density of the argyrodite-kind (e.g., type) solid electrolyte may be about 1.5 g/cc to about 2.0 g/cc. Because the argyrodite-kind (e.g., type) solid electrolyte has a density of 1.5 g/cc or more, the internal resistance of the all-solid secondary battery may be reduced, and the penetration of the solid electrolyte by Li may be effectively suppressed.

Solid Electrolyte Layer: Binder

The solid electrolyte layer 30 may include, for example, a binder. Examples of the binder included in the solid electrolyte layer may include, but are not limited to, styrene butadiene rubber (SBR), polytetrafluoroethylene, polyvinylidene fluoride, and polyethylene. Any suitable binder utilized in the related art may be utilized. The binder included in the solid electrolyte layer may be the same as or different from the binder included in the cathode active material layer 20 and the anode active material layer 30. In some embodiments, the binder may be omitted.

The content of the binder included in the solid electrolyte layer may be about 0 wt % to about 10 wt %, about 0 wt % to about 5 wt %, about 0 wt % to about 3 wt %, about 0 wt % to about 1 wt %, about 0 wt % to about 0.5 wt %, or about 0 wt % to about 0.1 wt %, with respect to the total weight of the solid electrolyte layer.

Anode Layer

As shown in FIG. 1, in the electrode structure 1, the anode active material layer 30 is disposed on the second portion 11b of the first surface 11 of the current collector 10.

Anode Active Material Layer: Anode Active Material

The anode active material layer 30 may include, for example, an anode active material and a binder.

The anode active material included in the anode active material layer 30 may have, for example, a particle shape. The average particle diameter of the anode active material having a particle shape may be, for example, about 4 µm or less, about 3 µm or less, about 2 µm or less, about 1 µm or less, or about 900 nm or less. The average particle diameter of the anode active material having a particle shape may be, for example, about 10 nm to about 4 µm, about 10 nm to about 3 µm, about 10 nm to about 2 µm, about 10 nm to about 1 µm, or about 10 nm to about 900 nm. When the anode active material has an average particle diameter in these ranges, reversible absorbing and/or desorbing of lithium may be easier during charging and discharging. The average particle diameter of the anode active material is, for example, a median diameter (D50) measured utilizing a laser particle size distribution meter.

The anode active material included in the anode active material layer 30 may include, for example, at least one selected from a carbon-based anode active material and a metal or metalloid anode active material.

In some embodiments, the carbon-based anode active material may be amorphous carbon. Examples of amorphous carbon may include, but are not limited to, carbon black (CB), acetylene black (AB), furnace black (FB), ketjen black (KB), and graphene. Any material may be utilized as long as it is classified as amorphous carbon in the related art. Amorphous carbon is carbon that does not have crystallinity or has very low crystallinity, and is distinguished from crystalline carbon or graphite-based carbon.

The metal or metalloid anode active material may include at least one selected from gold (Au), platinum (Pt), palladium (Pd), silicon (Si), silver (Ag), aluminum (Al), bismuth (Bi), tin (Sn), and zinc (Zn), but the present disclosure is not limited thereto. Any suitable material may be utilized as long as it is utilized as a metal anode active material or a metal or metalloid anode active material that forms an alloy or compound with lithium in the related art. For example, because nickel (Ni) does not form an alloy with lithium, it is not a metal anode active material.

The anode active material layer 30 may include a kind of anode active material among these anode active materials, or a mixture of a plurality of different anode active materials. For example, the anode active material layer 30 may include only amorphous carbon, or may include at least one selected from gold (Au), platinum (Pt), palladium (Pd), silicon (Si), silver (Ag), aluminum (Al), bismuth (Bi), tin (Sn), and zinc (Zn). In some embodiments, the anode active material layer 30 may include a mixture of amorphous carbon and at least one selected from gold (Au), platinum (Pt), palladium (Pd), silicon (Si), silver (Ag), aluminum (Al), bismuth (Bi), tin (Sn), and zinc (Zn). The mixing ratio of the mixture of amorphous carbon and gold and/or the like may be, for example, about 10:1 to about 1:2, about 5:1 to about 1:1, or about 4:1 to about 2:1 as a weight ratio, but the present disclosure is not limited thereto, and the mixing ratio may be selected according to the characteristics of the solid secondary battery 3. When the anode active material has such a composition, cycle characteristics of the all-solid secondary battery are further improved.

The anode active material included in the anode active material layer 30 may include, for example, a mixture of first particles made of amorphous carbon and second particles made of metal or metalloid. Examples of the metal or metalloid may include gold (Au), platinum (Pt), palladium (Pd), silicon (Si), silver (Ag), aluminum (Al), bismuth (Bi), tin (Sn), and zinc (Zn). In some embodiments, the metalloid may be a semiconductor. The content of the second particles may be about 8 wt % to about 60 wt %, about 10 wt % to about 50 wt %, about 15 wt % to about 40 wt %, or about 20 wt % to about 30 wt % based on the total weight of the mixture. When the second particle has a content within these ranges, for example, the cycle characteristics of the all-solid-state secondary battery 3 are further improved.

Anode Active Material Layer: Binder

Examples of the binder included in the anode active material layer 30 may include, but are not limited to, styrene-butadiene rubber (SBR), polytetrafluoroethylene, polyvinylidene fluoride, polyethylene, vinylidene fluoride/hexafluoropropylene copolymers, polyacrylonitrile, and polymethyl methacrylate. Any suitable binder utilized in the related art may be utilized. The binder may be a single binder or a plurality of different binders.

When the anode active material layer 30 includes a binder, the anode active material layer 30 is stabilized on the current collector 10. Further, cracking of the anode active material layer 30 is suppressed despite a volume change and/or relative position change of the anode active material layer 30 in the charging-discharging process. For example, when the anode active material layer 30 does not include a binder, it is possible for the anode active material layer 30 to be easily separated from the current collector 10. When the anode active material layer 30 is separated from the current collector 10, the current collector 10 comes into contact with the solid electrolyte layer 50 at the exposed portion of the current collector 10, thereby increasing the possibility of a short circuit. The anode active material layer 30 may be prepared by applying a slurry, in which a material constituting the anode active material layer 30 is dispersed, on the current collector 10 and drying the slurry. When the binder is included in the anode active material layer 30, it is possible to stably disperse the anode active material in the slurry. For example, when the slurry is applied on the current collector 10 by a screen printing method, it is possible to suppress the clogging of a screen (for example, clogging by aggregates of the anode active material).

Anode Active Material Layer: Other Additives

The anode active material layer 30 may further include additives utilized in related art all-solid secondary batteries, for example, a filler, a coating agent, a dispersing agent, and/or an ion conductive auxiliary agent.

Anode Layer: Anode Active Material Layer

The thickness of the anode active material layer 30 may be, for example, about 50% or less, about 40% or less, about 30% or less, about 20% or less, about 10% or less, or about 5% or less of the thickness of the cathode active material layer 20. The thickness of the anode active material layer 30 may be, for example, about 1 µm to about 20 µm, about 2 µm to about 10 µm, or about 3 µm to about 7 µm. When the anode active material layer 30 is too thin, lithium dendrites formed between the anode active material layer 30 and the current collector 101 may collapse the anode active material layer 30, so that it is difficult to improve the cycle characteristics of the all-solid secondary battery 3. When the thickness of the anode active material layer 30 increases excessively (e.g., becomes too thick), the energy density of the all-solid secondary battery 3 decreases, and the internal resistance of the all-solid secondary battery 3 by the anode active material layer 30 increases, so that it is difficult to improve the cycle characteristics of the all-solid secondary battery 3.

When the thickness of the anode active material layer 30 decreases, for example, the charging capacity of the anode active material layer 30 also decreases. The charging capacity of the anode active material layer 30 may be, for example, about 50% or less, about 40% or less, about 30% or less, about 20% or less, about 10% or less, about 5% or less, or about 2% or less of the charging capacity of the cathode active material layer 20. The charging capacity of the anode active material layer 30 may be, for example, about 0.1% to about 50%, about 0.1% to about 40%, about 0.1% to about 30%, about 0.1% to about 20%, about 0.1% to about 10%, about 0.1% to about 5%, or about 0.1% to about 2% of the charging capacity of the cathode active material layer 20. When the charging capacity of the anode active material layer 30 is too small, the anode active material layer 30 becomes very thin. Therefore, lithium dendrites formed between the anode active material layer 30 and the current collector 10 during repeated charging and discharging processes may collapse the anode active material layer 30, so that it is difficult to improve the cycle characteristics of the all-solid secondary battery 3. When the charging capacity of the anode active material layer 30 increases excessively, the energy density of the all-solid secondary battery 3 decreases, and the internal resistance of the all-solid secondary battery 3 by the anode active material layer 30 increases, so that it is difficult to improve the cycle characteristics of the all-solid secondary battery 3.

The charging capacity of the cathode active material layer 20 is obtained by multiplying the charging capacity density (mAh/g) of the cathode active material by the mass of the cathode active material in the cathode active material layer 20. When several kinds (e.g., types) of cathode active materials are utilized, the values of charge capacity density x mass are calculated for respective cathode active materials, and the sum of these values is the charging capacity of the cathode active material layer 20. The charging capacity of the anode active material layer 30 is calculated in the same way. That is, the charging capacity of the anode active material layer 30 is obtained by multiplying the charging capacity density (mAh/g) of the anode active material by the mass of the anode active material in the anode active material layer 30. When several types of anode active materials are utilized, the values of charge capacity density x mass are calculated for respective anode active materials, and the sum of these values is the charging capacity of the anode active material layer 30. Here, the charge capacity densities of the cathode active material and the anode active material are estimated utilizing an all-solid half-cell utilizing lithium metal as a counter electrode. The charging capacities of the cathode active material layer 20 and the anode active material layer 30 are directly measured by the measurement of the charging capacity utilizing the all-solid half-cell. When the measured charge capacity is divided by the mass of each active material, the charging capacity density is obtained. In some embodiments, the charging capacities of the cathode active material layer 20 and the anode active material layer 30 may be initial charging capacities measured during the first charging cycle.

Anode Layer: Second Anode Active Material Layer (Deposition Layer)

In some embodiments, the all-solid-state secondary battery 3 may further include a second anode active material layer disposed between the current collector 10 and the anode active material layer 30 by charging. The second anode active material layer is a metal layer including lithium and/or a lithium alloy. The metal layer includes lithium and/or a lithium alloy. Accordingly, because the second anode active material layer is a metal layer including lithium, it functions as, for example, a lithium reservoir. Examples of the lithium alloy may include, but are not limited to, a Li—Al alloy, a Li—Sn alloy, a Li—In alloy, a Li—Ag alloy, a Li—Au alloy, a Li—Zn alloy, a Li—Ge alloy, and a Li—Si alloy. Any suitable lithium alloy utilized in the related art may be utilized. The second anode active material layer may be made of one of these alloys, lithium, and/or may be made of several kinds of alloys.

The thickness of the second anode active material layer is not particularly limited, but may be, for example, about 1 μm to about 1000 μm, about 1 μm to about 500 μm, about 1 μm to about 200 μm, about 1 μm to about 150 μm, about 1 μm to about 100 μm, or about 1 μm to about 50 μm. When the thickness of the second anode active material layer is too thin, it is difficult for the second anode active material layer to serve as a lithium reservoir. When the second anode active material layer is too thick, the mass and volume of the all-solid secondary battery 3 may increase, and the cycle characteristics thereof may be rather deteriorated. The second anode active material layer may be, for example, a metal foil having a thickness within these ranges.

In the all-solid secondary battery 3, the second anode active material layer may be disposed between the current collector 10 and the anode active material layer 30 before assembly of the all-solid secondary battery 3 or may be deposited between the current collector 10 and the anode active material layer 30 by charging after assembly of the all-solid secondary battery 3. When the second anode active material layer is disposed between the current collector 10 and the anode active material layer 30 before assembly of the all-solid secondary battery 3, because the second anode active material layer is a metal layer including lithium, it functions as a lithium reservoir.

For example, a lithium foil may be disposed between the current collector 10 and the anode active material layer 30 before assembly of the all-solid secondary battery 3. Thus, the cycle characteristics of the all-solid secondary battery 3 including the second anode active material layer are further improved. When the second anode active material layer is deposited by charging after assembly of the all-solid secondary battery 3, the second anode active material layer is not included during assembly of the all-solid secondary battery 3, so that the energy density of the all-solid secondary battery 3 increases. For example, when charging the all-solid secondary battery 3, the all-solid secondary battery 1 is charged to exceed the charging capacity of the anode active material layer 30. That is, the anode active material layer 30 is overcharged. At the initial stage of charging, lithium is absorbed in the anode active material layer 30. The anode active material included in the anode active material layer 30 forms an alloy or compound with lithium ions that have migrated from the cathode active material layer 20. When the all-solid secondary battery 3 is charged to exceed the charging capacity of the anode active material layer 30, for example, lithium is deposited on the rear surface of the anode active material layer 30, that is, between the current collector 10 and the anode active material layer 30, and a metal layer corresponding to the second anode active material layer is formed by the deposited lithium. The second anode active material layer is a metal layer mainly including lithium (that is, metal lithium). Such a result is obtained, for example, when the anode active material included in the anode active material layer 30 is composed of a material that forms an alloy or compound with lithium. During discharging, lithium in the anode active material layer 30 and the second anode active material layer, that is, the metal layer, is ionized and moves toward the cathode active material layer 20. Accordingly, it is possible to utilize lithium as an anode active material in the all-solid secondary battery 3. Further, because the anode active material layer 30 covers the second anode active material layer, it serves as a protective layer for the second anode active material layer, that is, the metal layer, and serves to suppress the deposition growth of lithium dendrites. Therefore, the short circuit and capacity reduction of the all-solid secondary battery 3 are suppressed, and as a result, the cycle characteristics of the all-solid secondary battery 3 are improved. Further, when the second anode active material layer is disposed by charging after assembly of the all-solid secondary battery 3, the current collector 10 and the anode active material layer 30 and the region therebetween are, for example, Li-free regions that do not include lithium (Li) in the initial state or post-discharge state of the all-solid secondary battery.

All-Solid Secondary Battery

The all-solid secondary battery, which is a bipolar cell utilizing the same current collector, has a buffer structure inside the same current collector (e.g., inside the inner space formed by folding one current collector), so that it is possible to protect an anode layer from a volume change during charging and discharging, thereby improving the durability of the battery.

FIG. 3 is a schematic cross-sectional view of an all-solid secondary battery according to an embodiment.

As shown in FIG. 3, the all-solid secondary battery 3 is a bipolar all-solid secondary battery including: a unit cell 2 including the electrode structure 1; and a solid electrolyte layer 50 disposed on the cathode active material layer 20, wherein a plurality of the unit cells 2 are stacked. The all-solid secondary battery 3 has a structure in which a plurality of electrode structures 1 are stacked to have a bipolar connection structure, and a desired voltage design may be performed (e.g., obtained) by the bipolar connection structure.

According to an embodiment, 2 to 12 of the unit cells 2 may be stacked to constitute the all-solid secondary battery 3. The all-solid secondary battery 3 having an appropriate voltage range may be manufactured by stacking 2 to 12 of the unit cells 2.

The bipolar all-solid secondary battery 3 may further include: a first end plate 60 and a second end plate 60' respectively disposed on an electrolyte layer 50 and an anode active material layer 30 existing at two opposite ends of the stacked unit cell 1; a first half-cell 4 including a second anode active material layer 30', a second current collector 10', and a compression pad 40' between the electrolyte layer 50 existing at one end of the unit cell stack and the first end plate 60; and a second half-cell 5 including a second electrolyte layer 50', a second cathode active material layer 20', and a third current collector 10" between the anode active material layer 30 existing at the other end of the unit cell stack and the second end plate 60'.

According to some embodiments, an electrode structure can protect an anode layer by absorbing the volume change of an anode during charging and discharging, thereby improving the durability of a battery.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various suitable changes in form and details may be made therein without departing from the spirit and scope of the disclosure as defined by the following claims, and equivalents thereof.

What is claimed is:

1. An electrode structure comprising:
a current collector having a folded structure comprising an outer surface and an inner surface, the inner surface defining an inner space, wherein the outer surface comprises a first portion, a second portion facing oppositely away from the first portion, and an intermediate portion between the first portion and the second portion,
a cathode active material layer on the first portion of the outer surface;
an anode active material layer on the second portion of the outer surface; and
a compression pad disposed inside the inner space of the folded structure of the current collector,
wherein the compression pad consists of an elastic material selected from the group consisting of natural rubber, spandex, butyl rubber, fluoroelastomer, elastomer, ethylene-propylene rubber (EPR), styrene-butadiene rubber (SBR), chloroprene, elastin, epichlorohydrin rubber, nylon, terpene, isoprene rubber, polybutadiene, nitrile rubber, thermoplastic elastomer, ethylene-propylene-diene rubber (EPDM), halogenated butyl rubber, neoprene, and copolymers thereof, and the compression pad is capable of being pressed to have a thickness of about 40% to about 90% of an initial thickness thereof before being pressed.

2. The electrode structure of claim 1, wherein the intermediate portion of the outer surface and the inner surface are uncoated.

3. The electrode structure of claim 1,
wherein a lithium deposition layer is formed on an anode when charging an all-solid secondary battery comprising the electrode structure, and
wherein a thickness of the compression pad is about 200% to about 500% of a thickness of the lithium deposition layer.

4. The electrode structure of claim 1, wherein the compression pad has a thickness of about 50 μm to 300 μm.

5. The electrode structure of claim 1, wherein the current collector is made of at least one selected from stainless steel, aluminum (Al), copper (Cu), titanium (Ti), iron (Fe), cobalt (Co), nickel (Ni), alloys thereof, and clads thereof.

6. An electrode structure comprising:
a current collector having a folded structure comprising an outer surface and an inner surface, the inner surface defining an inner space, wherein the outer surface comprises a first portion, a second portion facing oppositely away from the first portion, and an intermediate portion between the first portion and the second portion,
a cathode active material layer on the first portion of the outer surface;

an anode active material layer on the second portion of the outer surface, the anode active material layer comprising at least one selected from a carbon-based anode active material and a metal or metalloid anode active material;

a compression pad disposed inside the inner space of the folded structure of the current collector, and a second anode active material layer between the current collector and the anode active material layer, wherein the second anode active material layer is a metal layer comprising lithium and/or a lithium alloy, wherein the compression pad consists of an elastic material selected from the group consisting of natural rubber, spandex, butyl rubber, fluoroelastomer, elastomer, ethylene-propylene rubber (EPR), styrene-butadiene rubber (SBR), chloroprene, elastin, epichlorohydrin rubber, nylon, terpene, isoprene rubber, polybutadiene, nitrile rubber, thermoplastic elastomer, ethylene-propylene-diene rubber (EPDM), halogenated butyl rubber, neoprene, and copolymers thereof, and the compression pad is capable of being pressed to have a thickness of about 40% to about 90% of an initial thickness thereof before being pressed.

7. A bipolar all-solid secondary battery comprising a stacked structure comprising a plurality of unit cells, wherein each unit cell of the plurality of unit cells comprises: the electrode structure of claim 1; and a solid electrolyte layer on the cathode active material layer.

8. The bipolar all-solid secondary battery of claim 7, wherein the solid electrolyte layer comprises a sulfide-based solid electrolyte, and the sulfide-based solid electrolyte is at least one selected from $Li_2S—P_2S_5$; $Li_2S—P_2S_5—Li_X$, wherein X is a halogen element; $Li_2S—P_2S_5—Li_2O$; $Li_2S—P_2S_5—Li_2O—LiI$; $Li_2S—SiS_2$; $Li_2S—SiS_2—LiI$; $Li_2S—SiS_2—LiBr$; $Li_2S—SiS_2—LiCl$; $Li_2S—SiS_2—B_2S_3—LiI$; $Li_2S—SiS_2—P_2S_5—LiI$; $Li_2S—B_2S_3$; $Li_2S—P_2S_5—Z_mS_n$, wherein m and n are each a positive number, and Z is one of Ge, Zn, and Ga; $Li_2S—GeS_2$; $Li_2S—SiS_2—Li_3PO_4$; $Li_2S—SiS_2—Li_pMO_q$, wherein p and q are each a positive number, and M is one selected from P, Si, Ge, B, Al, Ga, and In; $Li_{7-x}PS_{6-x}Cl_x$, wherein $0≤x≤2$; $Li_{7-x}PS_{6-x}Br_x$ wherein $0≤x≤2$; and $Li_{7-x}PS_{6-x}Cl_x$, wherein $0≤x≤2$.

9. The bipolar all-solid secondary battery of claim 7, wherein the stacked structure comprises 2 to 12 of the unit cells.

10. The bipolar all-solid secondary battery of claim 7, further comprising:

a first end plate on an electrolyte layer at a first end of the stacked structure and a second end plate on an anode active material layer at a second end opposite to the first end of the stacked structure;

a first half-cell between the electrolyte layer at the first end of the stacked structure and the first end plate, the first half-cell comprising a second anode active material layer, a second current collector, and a second compression pad; and a second half-cell between the anode active material layer at the second end of the stacked structure and the second end plate, the second half-cell comprising a second electrolyte layer, a second cathode active material layer, and a third current collector.

* * * * *